Figure 3:
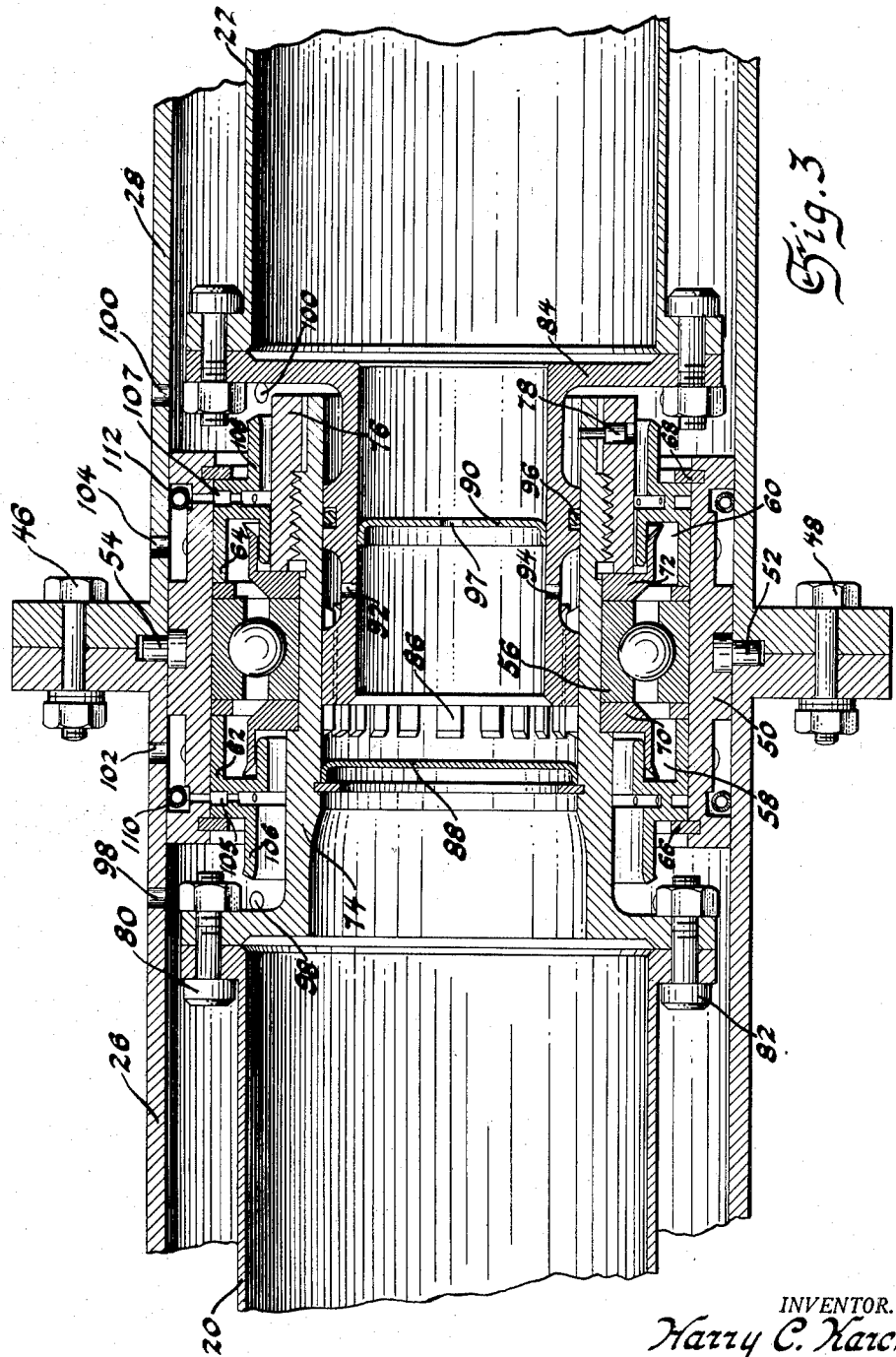

Dec. 25, 1956 H. C. KARCHER 2,775,104
ENGINE EXTENSION SHAFT
Filed March 12, 1952 2 Sheets-Sheet 1
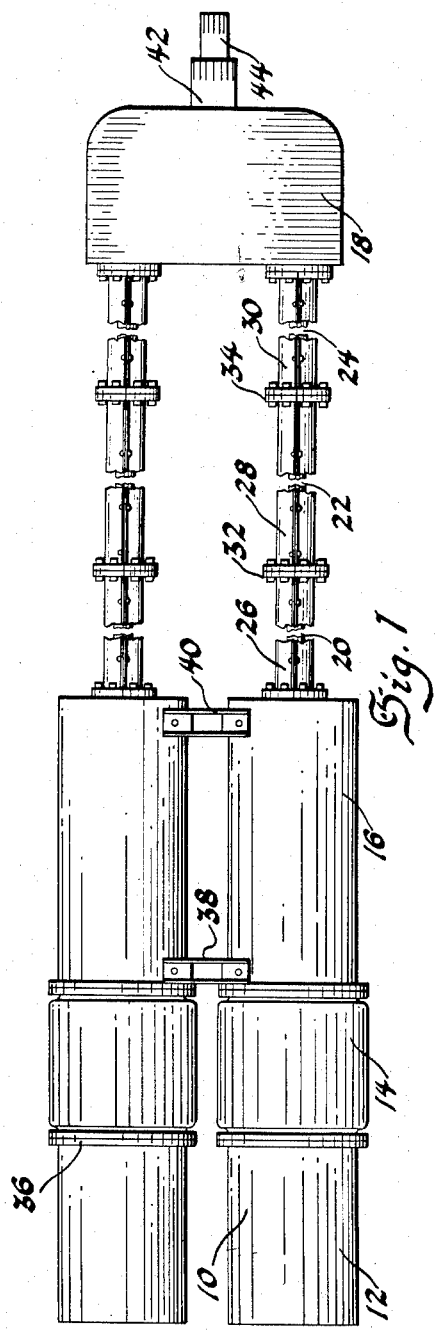
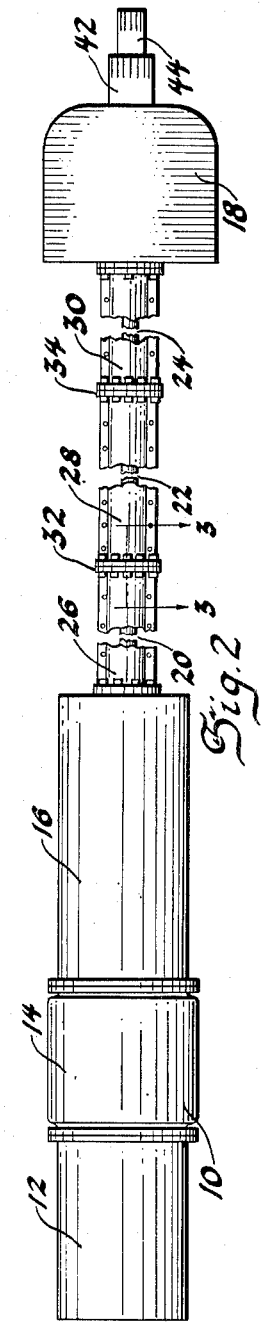
INVENTOR.
Harry C. Karcher
BY
Willits, Helwig & Baillio Dec. 25, 1956  H. C. KARCHER  2,775,104
ENGINE EXTENSION SHAFT
Filed March 12, 1952  2 Sheets-Sheet 2

INVENTOR.
Harry C. Karcher
BY
Willits, Helming & Baillio

United States Patent Office 2,775,104
Patented Dec. 25, 1956

2,775,104

ENGINE EXTENSION SHAFT

Harry C. Karcher, Indianapolis, Ind., assignor to General Motors Corporation, Detroit, Mich., a corporation of Delaware Application March 12, 1952, Serial No. 276,135

3 Claims. (Cl. 64—4)

This invention relates to a turbo propeller engine and more particularly to an extension shaft arrangement for coupling a gas turbine and a propeller shaft.

It is an object of this invention to provide a power shaft with a supporting bearing and an enclosing casing, and to cool the bearing by a flow of air induced by rotation of the shaft.

It is a further object of this invention to interconnect a pair of drive shafts by a lubricated spline connection, and to support the interconnected drive shafts on a lubricated bearing, and to provide a flow of filtered air to cool the bearing and the spline connection.

Further objects and advantages of the present invention will be apparent from the following description, reference being had to the accompanying drawings wherein a preferred form of the present invention is clearly shown.

In the drawings:

Figure 1 is a plan view of a turbo propeller power plant assembly incorporating a preferred form of my invention, Figure 2 is an elevational view of the assembly shown in Figure 1, and Figure 3 is a sectional view taken on the line 3—3 of Figure 2 illustrating a preferred embodiment of my invention in detail.

Referring now to the drawings in detail and more particularly to Figures 1 and 2, a gas turbine power plant 10 having a turbine section 12, a combustion section 14, and a compressor section 16 is connected to a propeller reduction gear assembly 18 by three spline-connected extension drive shafts 20, 22 and 24 which are intermediately supported at their ends in the interconnected tubular casing sections 26, 28 and 30 by bearings generally located at 32 and 34. In the particular engine shown, the casing sections 26, 28 and 30 are formed of semi-cylindrical shells bolted together, and are also bolted to the compressor section 16 and gear assembly 18, so that they may carry the weight of the extension shafts 20, 22 and 24. If desired, the bearings at 32 and 34 may be directly supported by the aircraft frame, rather than by the casing sections 26, 28 and 30, in which instance the casing sections serve only as dust excluding means. A gas turbine power plant 36, similar to the power plant 10, is also connected to the gear assembly 18 in the same manner. The power plants 10 and 36 have their compressor sections tied together at 38 and 40 and constitute a dual power unit that is utilized to drive the contra-rotating propeller drive shafts 42 and 44 through the reduction gear assembly 18.

A full appreciation of my invention can be had by understanding the problems which led to its conception. In a turbo propeller installation, such as is illustrated in Figures 1 and 2, the power plants may attain speeds as high as 15,000 R. P. M. and the extension drive shafts transmit considerable torque at these high speeds. In the particular assembly shown, it is necessary that the power plants be remotely located with respect to the propeller reduction gear assembly. The extension drive shafts must also be capable of operation under a slight amount of axial misalignment, inasmuch as the power plants and the reduction gear assembly are mounted on an aircraft frame that will flex to some extent under the varying stresses imposed in flight. From the foregoing considerations it can be readily seen that a major factor to be considered in coupling the power plants and reduction gear assembly is the reduction of vibratory forces in the coupling. Vibration is minimized by utilizing a series of relatively short spline-connected extension drive shafts which are supported by bearings located in stationary tubular casings extending between the power plants and reduction gear assembly.

Referring now to Figure 3, the tubular casing 26 is connected to the tubular casing 28 by a series of circumferentially spaced bolts, such as are shown at 46 and 48. A ring-like member 50 is located in the casings 26 and 28 by the radial pins 52 and 54. A ball bearing assembly 56 is mounted in the ring-like member 50 to support the shafts 20 and 22 for rotation. Reservoirs 58 and 60 are provided on either side of the ball bearing assembly 56 for the retention of a suitable bearing lubricant. The stationary ring seals 62 and 64 are located in the ring-like member 50 by the snap rings 66 and 68, while the rotatable ring seals 70 and 72 and the inner race of bearing 56 are located on the stub shaft 74 by a threaded sleeve 76 which is dowel-pinned at 78.

The stub shaft 74 is provided at one end with a flange that is secured to the extension shaft 20 by a series of circumferentially spaced bolts, such as are shown at 80 and 82, and the stub shaft 84 is similarly secured to the extension shaft 22. Torque is transmitted between the stub shafts 74 and 84 by the spline-connection generally shown at 86. The interior of the stub shafts is utilized as a reservoir for a suitable spline lubricant with the discs 88 and 90 acting as boundary walls for the lubricant. Passages 92 and 94 are provided in the stub shaft 84 so that centrifugal lubrication of the entire length of the splined connection may be attained, and a rubber O-ring 96 prevents leakage of the lubricant between the stub shafts and any excess lubricant will emit from the hole 97. The bearing assembly and the spline connection are packed with a suitable lubricant during the assembly of the extension shaft coupling.

An air cooling arrangement is employed to conduct away the heat generated by the bearing assembly and the splined connection. The bolts which interconnect the extension shafts and the stub shafts act as a centrifugal fan to exhaust air from the casing interior through circumferentially spaced passages in the casing, such as are indicated at 98 and 100. Air is drawn into the casing through similar passages in the casing, such as are indicated at 102 and 104, and through passages 105 and 107 formed in the ring-like member 50 and ring seals 62 and 64 to thereby cool the bearing. The ring seals 62 and 64 are provided with baffles 106 and 108 that serve to direct the flow of air along portions of the stub shaft, and that act as inlet passages for the centrifugal fans formed by the bolts connecting the stub and extension shafts.

Coil springs 110 and 112 are looped around circumferential recesses in the ring-like member 50 so that the air which is drawn into the casing will be freed of foreign materials, the springs forming an effective and inexpensive filter. If desired, screens can be banded around the exhaust passages 98 and 100 to prevent the entrance of foreign materials, and ring disks can be located between the inlet and outlet passages 102 and 98, and 104 and 100, to prevent the possibility of any air recirculation.

Referring again to Figures 1 and 2, it is noted that the construction of Figure 3 is also employed at 34, and that similar constructions may be employed where the ends of the extension shafts connect with the power plants and reduction gear assembly.

While the form of embodiment of the invention as herein disclosed constitutes a preferred form, it is to be understood that other forms might be adopted as may come within the scope of my invention which follows.

I claim:

1. In combination, a tubular shaft housing, a bearing supported therein, a stub shaft rotatably mounted in the bearing, the first shaft having a radially extending flange at an end thereof, a second shaft in the housing, means fastening the second shaft to the flange of the first shaft, the fastening means projecting from the face of the flange nearest the bearing, air inlet openings in the housing adjacent the bearing, air outlet openings in the housing adjacent the flange, and baffle means mounted in the housing for directing air entering the air inlets to a point adjacent the flange radially inward of the fastening means so that the fastening means serve to impel the air centrifugally from the inlets past the baffle to the outlets, the baffle constraining the air to flow adjacent the first shaft to cool the same.

2. Apparatus in accordance with claim 1 wherein the fastening means comprises an annular row of circumferentially spaced bolts on the flange.

3. Apparatus in accordance with claim 1 including a coil spring circumferentially disposed in the shaft housing and extending across the air inlet openings to filter the air flow.

References Cited in the file of this patent

UNITED STATES PATENTS

| | | |
|---|---|---|
| 2,423,973 | Halford | July 15, 1947 |
| 2,482,321 | Copeland et al. | Sept. 20, 1949 |
| 2,566,715 | Bessiere | Sept. 4, 1951 |

FOREIGN PATENTS

| | | |
|---|---|---|
| 483,770 | France | Mar. 15, 1917 |
| 636,304 | Great Britain | 1950 |
| 642,506 | Great Britain | Sept. 6, 1950 |